(12) United States Patent
Collart (10) Patent No.: US 9,544,786 B2
(45) Date of Patent: Jan. 10, 2017

(54) DEVICE, SYSTEM AND PROCESS FOR OPTIMIZING WIRELESS COVERAGE AND EXPERIENCE

(71) Applicant: TracFone Wireless, Inc., Miami, FL (US)

(72) Inventor: Daniel Collart, Miami, FL (US)

(73) Assignee: TracFone Wireless, Inc., Miami, FL (US)

( * ) Notice: Subject to any disclaimer, the term of this patent is extended or adjusted under 35 U.S.C. 154(b) by 0 days.

(21) Appl. No.: 14/720,209

(22) Filed: May 22, 2015

(65) Prior Publication Data
US 2016/0345186 A1 Nov. 24, 2016

(51) Int. Cl.
*H04W 24/02* (2009.01)
*H04W 48/18* (2009.01)
*H04W 64/00* (2009.01)

(52) U.S. Cl.
CPC ............ *H04W 24/02* (2013.01); *H04W 48/18* (2013.01); *H04W 64/006* (2013.01)

(58) Field of Classification Search
CPC .... H04W 36/12; H04W 36/165; H04W 48/06; H04W 72/10; H04W 76/02; H04W 24/02; H04W 24/08; H04W 24/10; H04W 64/006
USPC ................. 455/424; 370/230, 235, 328, 329
See application file for complete search history.

(56) References Cited

U.S. PATENT DOCUMENTS

| | | | |
|---|---|---|---|
| 2006/0198359 A1* | 9/2006 | Fok | H04W 24/00 370/351 |
| 2010/0087188 A1* | 4/2010 | Griff | H04L 12/2602 455/424 |
| 2014/0293781 A1* | 10/2014 | Adams | H04W 48/18 370/230 |
| 2015/0156122 A1* | 6/2015 | Singh | H04L 47/20 370/235 |
| 2015/0163755 A1* | 6/2015 | Tripathi | H04W 52/367 370/328 |
| 2015/0230274 A1* | 8/2015 | Sharma | H04W 76/022 370/329 |

* cited by examiner

*Primary Examiner* — Inder Mehra
(74) *Attorney, Agent, or Firm* — Baker Hostetler LLP (57) ABSTRACT

A system for optimizing wireless coverage on a wireless device includes a server for receiving performance data related to performance on wireless networks, analyzing the performance data related to performance on the wireless networks, determining optimized settings for the wireless device, and transmitting the optimized settings to the wireless device.

15 Claims, 4 Drawing Sheets

DEVICE, SYSTEM AND PROCESS FOR OPTIMIZING WIRELESS COVERAGE AND EXPERIENCE

BACKGROUND OF THE DISCLOSURE

1. Field of the Disclosure

The invention relates to a wireless service provider system and method for providing optimal wireless service. More particularly, the invention relates to systems, devices, and methods for providing optimal wireless service across multiple networks and wireless carriers.

2. Related Art

A large number of wireless service plans exist for customers desiring wireless services such as data, talk, text messaging, and the like. The wireless providers of those services typically can only provide services from their network. Accordingly, optimization across multiple wireless networks and wireless carriers cannot be accomplished as there is only one or at most a limited number of networks to access.

A need exists to provide a device, system, and method for optimizing wireless coverage and experience by optimizing the particular wireless networks a wireless device utilizes.

SUMMARY OF THE DISCLOSURE

The foregoing needs are met, to a great extent, by the invention, providing a device, system, and method for providing optimal wireless service for a wireless device across multiple networks.

According to some aspects of the disclosure, a wireless device for optimizing wireless access, the wireless device including a processor configured to collect performance data related to performance of a plurality of wireless networks, a transceiver configured to transmit the performance data to a server, the transceiver further configured receive, from the server, optimized settings for the wireless device, and the processor further configured to implement the optimized settings for the wireless device including selection of a network based on the optimized settings for the wireless device.

According to some aspects of the disclosure, a system for optimizing wireless coverage on a wireless device, the system including a server configured to receive performance data related to performance on a plurality of wireless networks, the server further configured to analyze the performance data related to performance on the plurality of wireless networks, the server further configured determine optimized settings for the wireless device, and the server further configured to transmit the optimized settings to the wireless device.

According to some aspects of the disclosure, a method of optimizing wireless coverage on a wireless device, the method including allowing the wireless device to connect to a plurality of wireless networks, receiving performance data related to performance on the plurality of wireless networks from the wireless device, processing the performance data related to performance on the plurality of wireless networks with a server, and determining optimized settings for the wireless device based on the performance data related to performance on the plurality of wireless networks with the server, and sending the optimized settings to the wireless device with the server.

There has thus been outlined, rather broadly, certain aspects of the invention in order that the detailed description thereof herein may be better understood, and in order that the present contribution to the art may be better appreciated. There are, of course, additional aspects of the invention that will be described below and which will also form the subject matter of the claims appended hereto.

In this respect, before explaining at least one aspects of the invention in detail, it is to be understood that the invention is not limited in its application to the details of construction and to the arrangements of the components set forth in the following description or illustrated in the drawings. The invention is capable of aspects in addition to those described and of being practiced and carried out in various ways. Also, it is to be understood that the phraseology and terminology employed herein, as well as the abstract, are for the purpose of description and should not be regarded as limiting.

As such those skilled in the art will appreciate that the conception upon which this disclosure is based may readily be utilized as a basis for the designing of other structures, methods and systems for carrying out the several purposes of the invention. It is important, therefore, that the claims be regarded as including such equivalent constructions insofar as they do not depart from the spirit and scope of the invention.

BRIEF DESCRIPTION OF THE DRAWINGS

The above mentioned features and aspects of the disclosure will become more apparent with reference to the following description taken in conjunction with the accompanying drawings wherein like reference numerals denote like elements and in which.

DETAILED DESCRIPTION

A large number of wireless service plans exist for customers desiring wireless services such as data, talk, text messaging, and the like. The wireless providers of those services need to be able to optimize settings for wireless device users based on performance data associated with the use of wireless devices on various mobile network operators (MNOs) and networks. This optimization can be accomplished with an application or system that collects performance data from any source providing service to the devices and optimizes settings for the wireless devices to enhance users' experience.

Convenience, timeliness, and reliability of the wireless providers' systems are key factors that play into a user's experience. By developing a system to improve at least these factors, a more positive experience can be provided to the user. The improved experience will help retain customer base and increase the amount of customers willing to purchase wireless services from MNOs and service providers such as mobile virtual network operators (MVNOs). In order to do so, the following needs can be addressed by with a system and method for optimizing wireless coverage and experience.

In this specification and claims it is to be understood that reference to a wireless device is intended to encompass electronic devices such as mobile phones, tablet computers, gaming systems, MP3 players, personal computers, PDAs, and the like. A "wireless device" is intended to encompass any compatible mobile technology computing device that can connect to a wireless communication network, such as mobile phones, mobile equipment, mobile stations, user equipment, cellular phones, smartphones, handsets, or the like (e.g., Apple iPhone, Google Android based devices, BlackBerry based devices, other types of PDAs or smartphones), wireless dongles, remote alert devices, or other mobile computing devices that may be supported by a wireless network. The term "wireless device" may be interchangeably used and referred to herein as "wireless handset," "handset," "mobile device," "device," "mobile phones," "mobile equipment," "mobile station," "user equipment," "cellular phone," "smartphones," "monitoring device" or "phone."

Wireless devices may connect to a "wireless network" or "network" and are intended to encompass any type of wireless network to obtain or provide mobile phone services through the use of a wireless device, such as the Global System for Mobile Communication (GSM) network, Code-Division Multiple Access (CDMA) network, Long-Term Evolution (LTE) network that may utilize the teachings of the present application to sell, activate, monitor, redeem, and/or track, the activation of one or more wireless services.

Reference in this specification to "one aspect," "an aspect," "other aspects," "one or more aspects" or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not for other aspects.

A large number of wireless service plans exist for customers desiring wireless services such as data, talk, and text messaging. To obtain these wireless services, customers generally have the option of entering into a post-paid service, e.g., contract for a period of time, or a pre-paid, contract-free service. The latter offers customers the freedom to initiate and stop wireless services without incurring expensive cancellation fees associated with a post-paid service.

Generally, companies that provide post-paid wireless services are wireless carriers or Mobile Network Operators (MNO) that maintain and control their own wireless networks. A MNO heavily relies on backend systems to address any provisional, billing, security and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services including volume of data and number of minutes/text messages used. The invention is especially applicable to MVNOs. However, MNOs may also utilize the invention.

Figure 1:
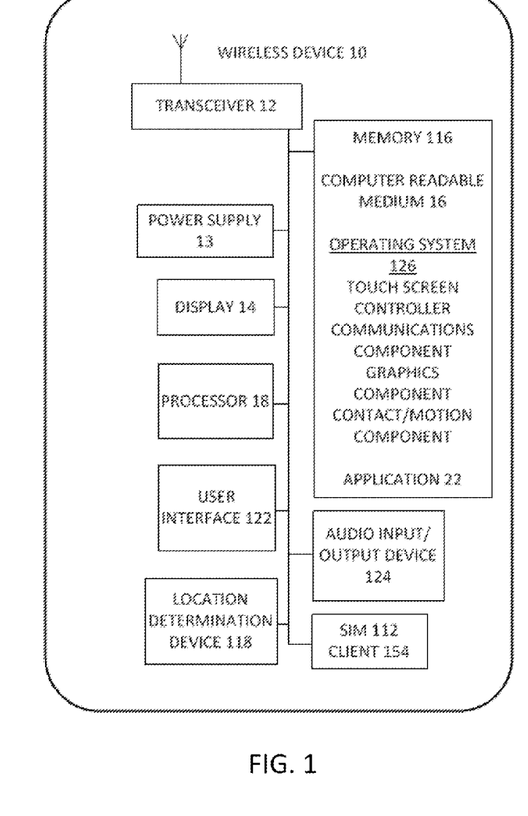
FIG. 1 illustrates a wireless device and its components, in accordance with aspects of the present disclosure.

FIG. 1 illustrates an exemplary wireless device 10 and its potential components. The wireless device 10 may include a transceiver 12, a display 14, a computer readable medium 16, a processor 18, and an application 22. The transceiver 12 can include, for example, a wireless antenna and associated circuitry capable of data transmission with a mobile data network utilizing at least one data transmission protocol, such as, for example, 3G, 4G Long Term Evolution (LTE), Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, combinations thereof, and/or the like. The transceiver 12 may transmit and receive data over the data transmission protocol.

The display 14 of the wireless device 10 can be configured to display various information provided to the display 14 from the processor 18 of the wireless device 10, computer readable medium 16, or application 22. The screen may be a light-emitting diode display (LED), an electroluminescent display (ELD), a plasma display panel (PDP), a liquid crystal display (LCD), an organic light-emitting diode display (OLED), or any other display technology.

The displayed information can include, for example, the amount of prepaid wireless data service available, the network connection strength, the type of mobile network data connection (such as 3G, 4G LTE, EVDO, etc.) the wireless device 10 is connected to, and/or other information potentially useful to the user. The information may be displayed simultaneously or the user may interact with an input device such as buttons on the wireless device 10 or, if the display 14 is a touch-screen, with the icons on the display 14 to cycle through the various types of information for display. For example, the display 14 may present the amount of prepaid wireless data service available, the network connection strength, and the type of mobile network data connection simultaneously. Alternatively, the display 14 may only present one type of information, for example, the amount of prepaid wireless data service available. The display 14 may then present other types of information if the user interacts with buttons on the wireless device 10 or, if the display is a touch-screen, with icons on the display 14.

The computer readable medium 16 may be configured to store the application 22. For the purposes of this disclosure, computer readable medium 16 stores computer data, which may include computer program code that may be executable by the processor 18 of the wireless device 10 in machine readable form. By way of example, and not limitation, the computer readable medium 16 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine readable medium, which may be incorporated into a computer program product. The computer readable medium 16 may also be configured to store data related to the amount of service used with particular networks 200, which types of data used, at which times of day and at which locations, at what speeds, message transmission and failure rates, call connection and failure rates, and the like. The computer readable medium 16 may also store information such as the amount of data used for each domain, web address, wireless device 10 programs, or other web resource during a given time period, such as, for example, one billing cycle. Other performance data may also be stored on the computer readable medium 16.

Additionally, the computer readable medium 16 may communicate to or present on the display 14 the various metrics described above. For example, the computer readable medium 16 may communicate to or present on the display 14 data related to the amount of service used with particular networks 200, which types of data used, at which times of day and at which locations, at what speeds, message transmission and failure rates, call connection and failure rates, and the like. Similarly, the computer readable medium 16 may also communicate to or display on the display 14 the amount of data sent and received. Moreover, the computer readable medium 16 may communicate to or display on the display 14 the amount of data that may be remaining from the previously purchased and/or credited amount of data. Other performance data may also be presented on the display 14.

The processor 18 may be configured to execute the application 22. The processor 18 can be, for example, dedicated hardware as defined herein, a computing device as defined herein, a microprocessor, a central processing unit (CPU), a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the application 22.

Additionally, the processor 18 may communicate to or present on the display 14 the various metrics described above. For example, the processor 18 may communicate to or present on the display 14 the amount of data used. Similarly, the processor 18 may also communicate to or present on the display 14 the amount of data sent and received and at which data speed. Moreover, the processor 18 may communicate to or present on the display 14 the amount of data that may be remaining from the previously purchased and/or credited amount of data.

The wireless device 10 may also have a power supply 13. The power supply 13 may be a battery such as nickel cadmium, nickel metal hydride, lead acid, lithium ion, lithium ion polymer, and the like. The wireless device 10 may also include a memory 116, which could be internal memory or a removable storage type such as a memory chip. The memory 116 may store information about the wireless device 10, including wireless profiles and settings. Another information storage type that the wireless device may use is a subscriber identity module (SIM) card 112. The SIM 112 could vary in size and could be a micro, mini, or nano size, and may include a converted combination of any size SIM 112. The SIM 112 may be associated with a client 154 which may manage SIMs 112 to which the wireless device 10 may connect. Additionally, the wireless device 10 may include an audio input/output device 124 for the input or output of sounds in videos, music, and the like.

The wireless device 10 may also have a user interface 122 to facilitate use of the wireless device 10 with an operating system 126. The operating system 126 may be associated with a touchscreen controller, one or more communications components, one or more graphics components, one or more contact/motion components, and the like.

According to another aspect of the disclosure, the wireless device 10 and/or a network 200 may estimate the location of the wireless device 10 based, at least in part, on a global navigation satellite system (GNSS) with the location determination device 118. In another aspect, a network 200 may secure location determination based on a specific cell in which the wireless device 10 connects. In yet another aspect, a network 200 may obtain location determination based on triangulation with respect to a plurality of cells in which the wireless device 10 receives signals. Each of these approaches may be implemented with a location determination device 118.

One or more applications 22 may be on the wireless device 10. The application 22 may be an electronic application or software application configured to track prepaid data usage and the remaining amount of prepaid data available, along with performance data for each network 200, which may have one or more carriers. The application 22 may be written in any programming language, such as, for example, C, Java, Objective-C, C+, Python, Visual Basic, Perl, or any other programming language the processor 18 is capable of executing. The application 22 may also meter how much data has been used on a given domain, web address, wireless device application, or other web resource, and the performance data of the wireless device 10 on each network 200 that the wireless device 10 has used.

Additionally, the application 22 may communicate to or present on the display 14 the various metrics described above. For example, the application 22 may communicate to or present on the display 14 the amount of data used and at what data speed. Similarly, the application 22 may also communicate to or present on the display 14 the amount of data sent and received. Moreover, the application 22 may communicate to or present on the display 14 the amount of data that may be remaining from the previously purchased and/or credited amount of data associated with the MVNO account. Via the transceiver 12, the application 22 may communicate with a network 200 to transmit wireless device 10 performance data and messages related to account performance data. The application 22 may be configured to communicate with the MVNO cloud 252 to transmit performance data and notifications related to usage of the wireless device 10 and/or any users associated with the MVNO account.

Figure 2:
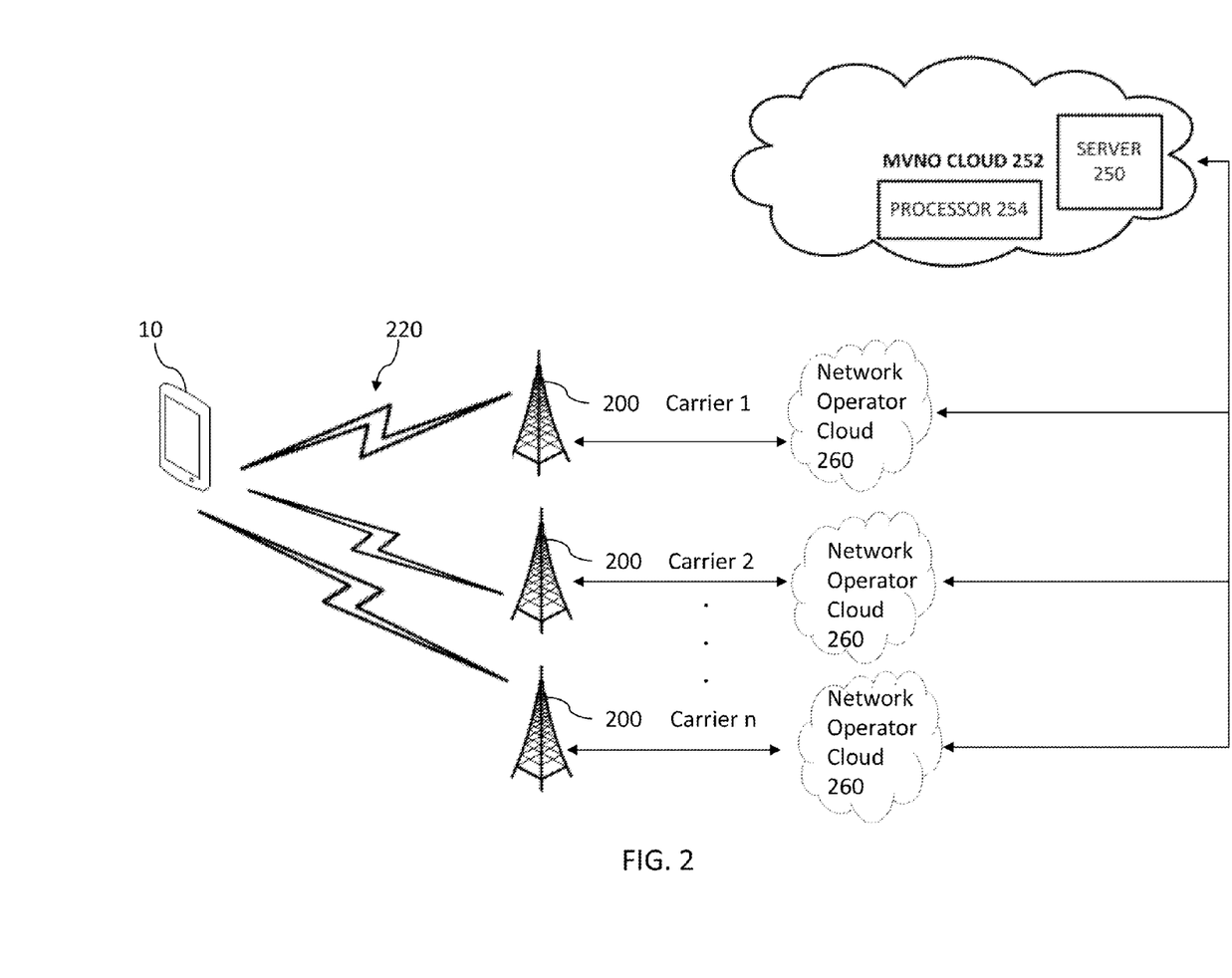
FIG. 2 illustrates the way that the wireless device may connect with a variety of networks and with a service provider, in accordance with aspects of the present disclosure.

Performance data may include dropped call data, signal strength and fluctuation data, speed of data transmissions, location data, and the like associated with the use of the wireless device 10 on one or more networks 200 (see FIG. 2). The transceiver 12 may receive such performance data from one or more networks 200 during or after wireless device 10 use on the networks 200. The processor 18 and/or the application 22 may process the performance data and determine optimal settings for the use of the wireless device 10 based on the performance data. The application 22 may be made available by the MVNO cloud 252, may be downloaded by the wireless device 10 from the MVNO cloud 252, may be on a chipset or SIM card on the wireless device 10, or may be part of the system bios of the wireless device 10.

Optimal settings for the use of the wireless device 10 may include the selection of optimal networks 200 based on location and/or time, network 200 capacity, type of wireless device 10 usage, and the like. The processor 18 and/or the application 22 on the wireless device 10 may implement the optimal settings on the wireless device 10 so that the wireless device 10 is able to select a network 200 based on a variety of factors such as time, location, type of wireless device 10 use, cost, and the like. Implementation may include automatically applying the optimal settings on the wireless device 10 with the processor 18 and/or the application 22, or may include using the processor 18 and/or the application 22 to provide an option to the user of the wireless device 10 to have the processor 18 and/or the application 22 apply the optimal settings. The option to apply the optimal settings may include text or voice prompts on the wireless device 10, including visually presenting an option on the display 14. An option may be useful if, for example, the user of the wireless device 10 has a predetermined maximum amount of minutes or data allowed with a particular network 200, and may prefer to save the minutes or data even if that may mean using a sub-optimal network 200.

In another example, performance data may demonstrate that a particular network 200 is optimal for a particular kind of use of the wireless device 10 at a certain time, or is at least better for the particular kind of use of the wireless device 10 than another network 200. When a wireless device 10 user attempts to use the wireless device 10 in a particular manner at that time, the wireless device 10 may automatically select or provide to the user the option to select the optimal or superior network 200 for that particular use of the wireless device 10. Likewise, if the wireless device 10 user is already using a sub-optimal network 200 at a particular time, the wireless device 10 may automatically select or provide the user the option to select the optimal network 200 for use. The optimization based on performance data may also be performed by the MVNO, as is explained in connection with FIG. 2.

Optimal settings may also be used to create one or more data models based at least in part on the user's location and/or use of the wireless device 10. A data model may be created and saved on the MVNO cloud 252 and/or on the wireless device 10 and categorized based on factors such as location and/or time. When the factors associated with a data model are relevant, such as when the wireless device 10 is being used at a particular time and/or location, the wireless device 10 may automatically apply the settings associated with the data model or may provide an option to the user to implement the settings associated with the data model on the wireless device 10. The MVNO cloud 252 may also apply the settings associated with the data model on behalf of the wireless device 10.

FIG. 2 illustrates possible electronic connections between the wireless device 10, a network 200, and/or the MVNO cloud 252. More than one network 200 may be available to the wireless device 10 at a given time and/or location and based on the type of service desired for use of the wireless device 10. The type of service provided by the network 200 may include data, voice, SMS or other messaging, and the like.

The variety of available carriers associated with one or more networks 200 are represented in FIG. 2 by carrier 1, carrier 2, . . . carrier n. A network 200 may have its own subscriber profile repository (not shown) which can verify a wireless user account associated with the wireless device 10. When the wireless device 10 has been authenticated on a network 200, the wireless device 10 may connect to a gateway support node (not shown) associated with the network 200 to access the mobile web and/or other services available to the wireless device 10 on the network 200. The gateway support node may also operatively link the wireless device 10 to communicate billing and policy services associated with the network 200. Similarly, the wireless device 10 may connect to a network 200 such as a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an inter-network, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

When the wireless device 10 is accessing a network 200, it may be desirable to generate and maintain performance data such as dropped call data, signal strength and fluctuation data, speed of data transmissions, location data, and the like associated with the use of the wireless device 10 on one or more networks 200. The performance data may be relative to a location of the wireless device 10 and/or the time of day. Other performance data may include usage data for the wireless device 10 and/or any accounts associated with the wireless device 10, prepaid plan selections, account balance information, historical account usage data, and the like. This kind of performance data can therefore be analyzed to optimize use of the wireless device 10 and thus enhance a user's experience.

The wireless device 10 may collect such performance data from each wireless network 200 to which the wireless device 10 connects. The performance data may be received by the wireless device 10 via the transceiver 12 and analyzed by the application 22. The analysis by the application 22 may include determinations of the best network 200 to use based on factors such as time, location, and type of use. In one example, a wireless device 10 may be used to transmit a message from a particular location at a particular time of day. The application 22 may determine, with the help of the processor 18, that a particular network 200 available to the wireless device 10 at that time and location may be optimal for that wireless device 10 transmission. The wireless device 10 may automatically connect to that network 200 via the transceiver 12 or may present an option on the display 14 for the user to select the optimal network 200 and/or select an optimal format for the type of use desired for the wireless device 10.

The optimization process may also be performed at least in part by the MVNO cloud 252, which may employ a centralized server 250 to receive and store the performance data. The wireless device 10 may provide performance data that it receives to the MVNO cloud 252. To provide the performance data to the MVNO cloud 252, the wireless device 10 may be connected to the network 200 so that performance data for that network 200 may be transmitted to the MVNO cloud 252. On the MVNO cloud 252, which may contain one or more processors 254, the MVNO cloud 252 may receive the performance data. After receiving the performance data, the MVNO cloud 252 may process that data and determine optimal settings for the wireless device 10.

Determining optimal settings on the MVNO cloud 252 for the wireless device 10 may include establishing a user profile and/or a general profile, each profile possibly based at least in part on a geographic location of the wireless device 10 and/or other factors such as time and type of wireless device 10 use. The MVNO cloud 252 may categorize the performance data and optimal settings based on factors such as time and location, and may transmit those settings to the wireless device 10 based on the factors such as time and location. In one example, at a particular time and/or location, the MVNO cloud 252 may transmit to the wireless device 10 optimal settings and/or profiles to implement on the wireless device 10. The wireless device 10 may receive those optimal settings from the MVNO cloud 252 through a connection to the network 200, which may connect to the MVNO cloud 252 via a Network Operator Cloud 260, and may implement those settings on the wireless device 10. The wireless device 10 may automatically implement the settings and/or profiles on the wireless device 10, or may provide an option to the user to implement the settings and/or profiles on the wireless device 10.

In another example, the MVNO cloud 252 and/or wireless device 10 may determine that it would be optimal to transmit through a home location register (HLR) on a network 200. An HLR (not shown) may be a database which maintains records of a subscriber authorized to use the affiliated network 200. It may be desirable to transmit from the wireless device 10 through the HLR so that the cost of the wireless device 10 usage may be reduced for the MVNO. Once the determination is made that the use of an HLR is desirable for the wireless device 10, the wireless device 10 may communicate with the network 200 in such a way as to be routed through the HLR.

In another example of the disclosure, a user may attempt to place a call with the wireless device 10. Before or upon placing the call, the wireless device 10 may automatically select the optimal network 200 to use for that call. The selection of the optimal network 200 to use for the call may be based on the optimized settings established by either the wireless device 10 or by the centralized server 250 of the MVNO cloud 252. The wireless device 10 may also provide the option to the user to select the determined optimal network 200 to use for the call when the user attempts to place the call on the wireless device 10. The selection of an optimal network 200 may be useful in a situation, for example, in which one network 200 may require roaming services based on the location of the wireless device 10. In such a situation, it may be desirable to determine and use an optimal wireless network 200 which does not require roaming services and which may provide a stronger, more consistent connection for a higher quality call.

Figure 3:
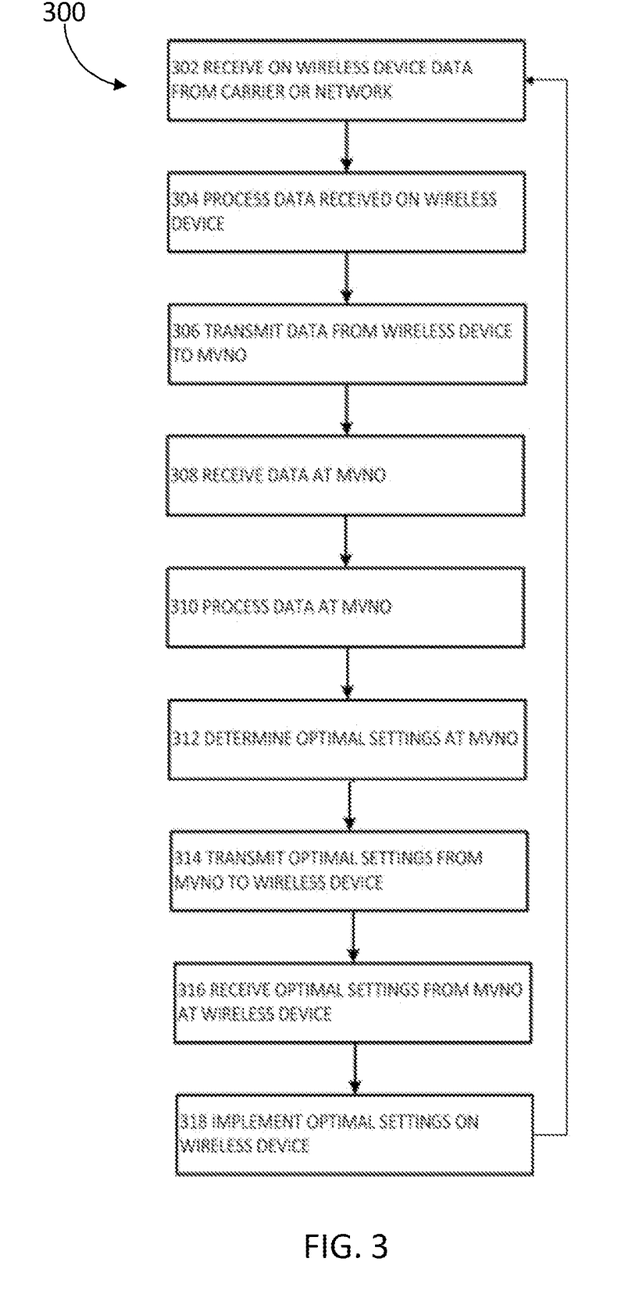
FIG. 3 illustrates a process for communicating performance data from the wireless device to the service provider to optimize settings on the wireless device, in accordance with aspects of the present disclosure.

The process 300 for the optimization of the wireless device 10 is illustrated in FIG. 3. The process 300 may begin once the wireless device 10 has been connected to a network 200 and has started receiving service from the network 200. At step 302, the wireless device 10 may receive performance data from the network 200 to which the wireless device 10 is connected. The performance data received at step 302 may include dropped call data, signal strength and fluctuation data, speed of data transmissions, location data, and the like associated with the use of the wireless device 10 on one or more networks 200.

After the wireless device 10 has received the performance data from the network 200, the wireless device 10 may process that performance data at step 304. This processing may be performed by the processor 18 and/or the application 22, and may include determining optimal settings for the wireless device 10. At step 306, the wireless device 10 may transmit the performance data and/or optimal settings to the MVNO cloud 252 via the transceiver 12.

The MVNO cloud 252 may receive the performance data and/or optimal settings from the wireless device 10 at step 308. Proceeding from step 308, the MVNO cloud 252 may at step 310 process the performance data and/or settings received from the wireless device 10. Processing data and/or settings at step 310 may include categorizing the data and/or settings based on one or more factors and creating one or more user profiles. At step 312, the MVNO cloud 252 may, with the help of one or more processors 254, determine optimal settings for the wireless device 10 based on those factors and/or other criteria. The determination of optimal settings at step 312 for the wireless device 10 may include establishing a user profile and/or general profile based on factors such as geographic location and time. The MVNO cloud 252 may use the centralized server 250 to perform this determination of optimal settings and establishing of profiles.

When the optimal settings have been determined by the MVNO cloud 252, the MVNO cloud 252 at step 314 may transmit the optimal settings and/or profiles to the wireless device 10. At step 316, the wireless device 10 may receive the optimal settings and/or profiles from the MVNO cloud 252. Once the wireless device 10 has received the optimal settings at 316, the wireless device may proceed to step 318 and implement those optimal settings on the wireless device 10. Implementing the optimal settings may include automatically implementing the settings or providing an option on the wireless device 10 to the user to select the implementation of the optimal settings. The process 300 then returns to and repeats from step 302 so that the wireless device 10 may continue to receive performance data and continuously or periodically update settings based on changes in relevant circumstances.

If the wireless device 10 instead optimizes its own settings. Thereafter, the wireless device 10 may dynamically transmit via the transceiver 12 updated optimal settings and environment changes to the MVNO cloud 252 so that the MVNO may process and maintain that information. Even in such an example, the MVNO cloud 252 may still determine optimal settings and establish profiles for use on the wireless device 10. The MVNO cloud 252 may transmit those settings and/or profiles to the wireless device 10 for consideration and/or use.

The wireless device 10 may also implement the optimized settings without having or using the application 22. In such an example, the wireless device 10 may still provide performance data to the MVNO cloud 252, which may receive and process the performance data to determine optimal settings for the wireless device 10. If the wireless device 10 does not have the application 22, is not using the application 22, or if the MVNO cloud 252 is otherwise configured to select the network 200 for the wireless device 10, the MVNO cloud 252 may select the optimal network 200 for the wireless device 10 to use. The selection of the network 200 may be based on the type of usage for the wireless device 10, the location of the wireless device 10, the time of day, and the like.

Figure 4:
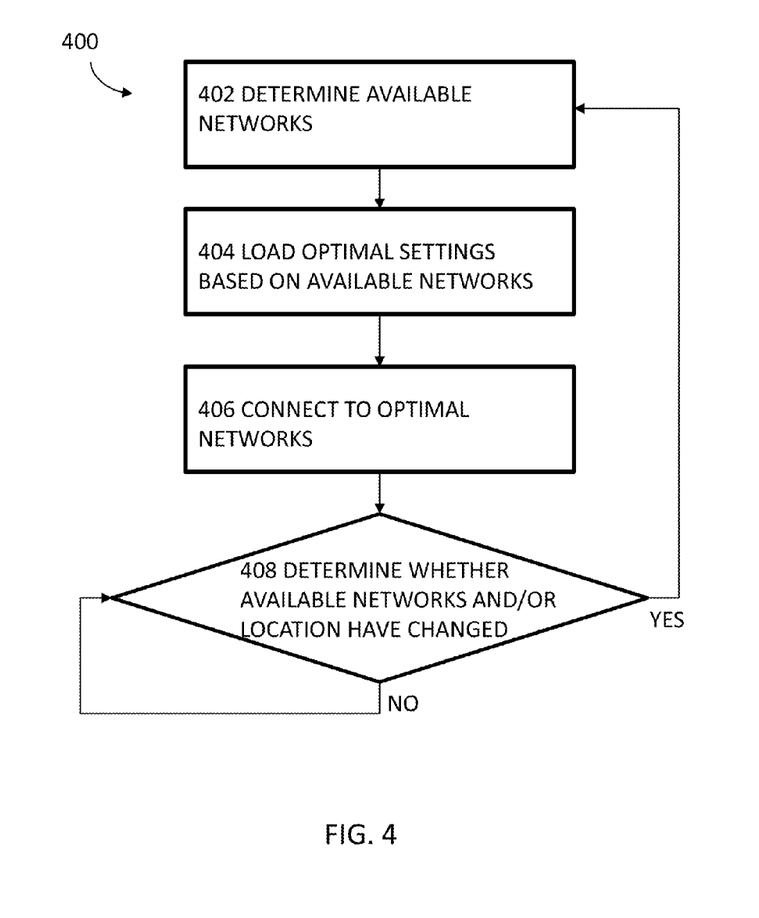
FIG. 4 illustrates a process for optimizing settings on the wireless device, in accordance with aspects of the present disclosure.

FIG. 4 illustrates a process 400 for optimizing settings on the wireless device 10 using the wireless device 10 once the optimized settings have been determined and have been received by or generated by the wireless device 10. Starting at step 402, the wireless device 10 may determine whether any networks 200 are available for the wireless device 10 to use. The determination at step 402 may include determining which, if any, networks 200 are available for the wireless device 10 based on the location and/or time of the wireless device 10, and/or based on the type of use of the wireless device 10 is desired.

The process 400 may continue to step 404 where the wireless device 10 may load optimal settings based on available networks 200 determined at step 402. The optimal settings may be based on the location and/or time of the wireless device 10, and/or based on the type of use of the wireless device 10 is desired. The optimal settings may alternatively or also be based on the profiles generated by the MVNO cloud 252.

Next the process 400 may proceed to step 406 where the wireless device 10 may connect to the optimal network 200 based on the optimal settings loaded by the wireless device 10 at step 404. The wireless device 10 may continue to evaluate whether or not its settings are optimal. To continue the evaluation, at step 408 the wireless device 10 may determine whether there have been any changes in available networks 200 and/or in the location of the wireless device 10 since the optimal settings were implemented on the wireless device 10. If yes, then the process 400 may return to step 402 to determine which networks 200 are available. If no, then the process 400 may continue to determine at step 408 whether there have been any changes in available networks 200 and/or in the location of the wireless device 10 since the optimal settings were implemented on the wireless device 10. The process 400 may therefore allow the wireless device 10 to continually determine if its settings are optimal based on factors such as the location of the wireless device 10 and which networks 200 may be available.

Thus a device, system, and method for providing optimal wireless service for a wireless device across multiple networks have been disclosed. The disclosed subject matter may allow wireless providers to optimize settings for wireless device users based on a variety of performance data associated with the use of wireless devices on multiple networks. The optimization of wireless services across multiple wireless networks and carriers may improve the experience of users of wireless service plans that allow wireless service across multiple networks.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may include, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel 220 as defined herein. The server may use memory with error detection and correction, redundant disks, redundant power supplies and so on.

The invention may include communication channels 220 that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The invention may be implemented in any type of computing devices or processor, such as, e.g., a desktop computer, personal computer, a laptop/mobile computer, a personal data assistant (PDA), a mobile phone, a tablet computer, cloud computing device, and the like, with wired/wireless communications capabilities via the communication channels 220.

In an embodiment, the invention may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the invention is considered to include a tangible storage medium or distribution medium, as listed herein and including art-recognized equivalents and successor media, in which the software implementations herein are stored.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless device for optimizing wireless access, the wireless device comprising:
   a processor configured to collect performance data related to performance of a plurality of wireless networks;
   a transceiver configured to transmit the performance data to a server;
   the transceiver further configured receive, from the server, optimized settings for the wireless device; and
   the processor further configured to implement the optimized settings for the wireless device including selection of a network based on the optimized settings for the wireless device,
   wherein the processor is further configured to compare a type of usage for the wireless device to the optimized settings and to select a network based on the comparison of the type of usage for the wireless device and the optimized settings.

2. The wireless device of claim 1, wherein the processor is further configured to analyze the performance data related to performance on the plurality of wireless networks.

3. The wireless device of claim 1, further comprising a location determination device configured to determine a location of the wireless device, wherein the processor is further configured to compare a location for the wireless device to the optimized settings and to select a network based on the comparison of the location of the wireless device and the optimized settings.

4. A system for optimizing wireless coverage on a wireless device, the system comprising:
   a server configured to receive performance data related to performance on a plurality of wireless networks;
   the server further configured to analyze the performance data related to performance on the plurality of wireless networks;
   the server further configured determine optimized settings for the wireless device; and
   the server further configured to transmit the optimized settings to the wireless device,
   wherein the wireless device is configured to:
      receive the optimized settings;
      implement the optimized settings; and
      select a network for the wireless device based on the optimized settings for the wireless device; and
   wherein the wireless device is further configured to compare a type of usage for the wireless device to the optimized settings and to select a network based on the comparison of the type of usage for the wireless device and the optimized settings.

5. The system of claim 4, wherein the wireless device is further configured to compare a location for the wireless device to the optimized settings and to select a network based on the comparison of the location of the wireless device and the optimized settings.

6. The system of claim 4, wherein the server is further configured to select a network for the wireless device based on the optimized settings for the wireless device.

7. The system of claim 4, wherein the server is further configured to compare a location for the wireless device to the optimized settings and to select a network based on the comparison of the location of the wireless device and the optimized settings.

8. The system of claim 4, wherein the performance data comprises dropped call data, signal strength and fluctuation data, and speed of data transmissions.

9. A system for optimizing wireless coverage on a wireless device, the system comprising:
   a server configured to receive performance data related to performance on a plurality of wireless networks;
   the server further configured to analyze the performance data related to performance on the plurality of wireless networks;
   the server further configured determine optimized settings for the wireless device; and
   the server further configured to transmit the optimized settings to the wireless device,
   wherein the server is further configured to compare a type of usage for the wireless device to the optimized settings and to select a network based on the comparison of the type of usage for the wireless device and the optimized settings.

10. A method of optimizing wireless coverage on a wireless device, the method comprising:
    allowing the wireless device to connect to a plurality of wireless networks;
    receiving performance data related to performance on the plurality of wireless networks from the wireless device;
    processing the performance data related to performance on the plurality of wireless networks with a server;
    determining optimized settings for the wireless device based on the performance data related to performance on the plurality of wireless networks with the server; and sending the optimized settings to the wireless device with the server; and
    comparing a type of usage for the wireless device to the optimized settings and selecting a network based on the comparison of the type of usage for the wireless device and the optimized settings.

11. The method of claim 10, wherein the performance data comprises dropped call data, signal strength and fluctuation data, and speed of data transmissions.

12. The method of claim 10, wherein sending the optimal settings on the wireless device comprises selecting a network based on the optimized settings for the wireless device.

13. The method of claim 10, further comprising comparing a location for the wireless device to the optimized settings and selecting a network based on the comparison of the location of the wireless device and the optimized settings.

14. The method of claim 10, further comprising:
   transmitting the analyzed performance data to a server;
   processing the performance data in the server;
   determining the optimized settings for the wireless device in the server;
   transmitting the optimized settings for the wireless device by the server;
   receiving the optimized settings for the wireless device in the wireless device; and
   implementing the optimized settings on the wireless device.

15. The method of claim 14, wherein implementing the optimized settings for the wireless device comprises transmitting from the wireless device to a home location register.

\* \* \* \* \*